(12) United States Patent
Predmore, II

(10) Patent No.: US 11,201,908 B2
(45) Date of Patent: Dec. 14, 2021

(54) UPLOADING DATA FROM MOBILE DEVICES

(71) Applicant: SEON DESIGN (USA) CORP., Coquitlam (CA)

(72) Inventor: Thomas J. Predmore, II, Salem, OR (US)

(73) Assignee: Seon Design (USA) Corp., Coquitlam (CA)

( * ) Notice: Subject to any disclaimer, the term of this patent is extended or adjusted under 35 U.S.C. 154(b) by 262 days.

(21) Appl. No.: 15/115,860

(22) PCT Filed: Jan. 15, 2015

(86) PCT No.: PCT/US2015/011571
§ 371 (c)(1),
(2) Date: Aug. 1, 2016

(87) PCT Pub. No.: WO2015/119753
PCT Pub. Date: Aug. 13, 2015

(65) Prior Publication Data
US 2017/0013045 A1      Jan. 12, 2017

Related U.S. Application Data

(60) Provisional application No. 61/935,974, filed on Feb. 5, 2014.

(51) Int. Cl.
*H04L 29/08* (2006.01)
*H04W 76/30* (2018.01)
(Continued)

(52) U.S. Cl.
CPC .......... *H04L 67/06* (2013.01); *H04L 67/1097* (2013.01); *H04W 4/80* (2018.02);
(Continued)

(58) Field of Classification Search
CPC .... H04L 67/06; H04L 67/1097; H04W 76/06; H04W 76/30; H04W 4/046; H04W 4/80;
(Continued)

(56) References Cited

U.S. PATENT DOCUMENTS 8,412,798 B1      4/2013   Wang
9,866,668 B2 *    1/2018   Turvey ................. G06F 13/382
(Continued)

FOREIGN PATENT DOCUMENTS

CN      102004920 B  *  4/2013
EP        1480408 A1     11/2004
(Continued)

OTHER PUBLICATIONS

The International Search Report and The Written Opinion of The International Searching Authority, or The Declaration for International Application No. PCT/US2015/011571 dated Aug. 19, 2015.

*Primary Examiner* — Kostas J Katsikis
(74) *Attorney, Agent, or Firm* — Michael D. Lazzara; Leech Tishman Fuscaldo & Lampl

(57) ABSTRACT

A method of transferring data includes connecting a mobile device to each of a plurality of network devices at separate respective times and via a respective network connection for each network device. Each of the network devices is connected to a separate respective logical computing network. The method also includes transferring a different respective portion of a data file from the mobile device to each respective network device via the respective network connection and storing the respective portion of the data file on the respective logical computing network. The method further includes disconnecting the mobile device from each respective network connection before connecting to any other one of the network devices. It is also contemplated that the method can account for instances where disconnection of (Continued)

the mobile device from a network device results in incomplete or corrupt transfer of data.

25 Claims, 2 Drawing Sheets

(51) Int. Cl.
*H04W 4/80* (2018.01)
*H04W 36/00* (2009.01)
*H04N 21/4147* (2011.01)

(52) U.S. Cl.
CPC ........ *H04W 76/30* (2018.02); *H04N 21/4147* (2013.01); *H04W 36/0011* (2013.01)

(58) Field of Classification Search
CPC .......... H04W 36/0011; H04N 21/4147; G06K 9/00362; G06K 9/00624; G06K 9/00711; G06K 9/00771; G06K 9/00791; G06K 9/00832; G06T 2207/30236
See application file for complete search history.

(56) References Cited

U.S. PATENT DOCUMENTS

| | | | | |
|---|---|---|---|---|
| 10,028,117 | B1* | 7/2018 | Haim | H04W 8/245 |
| 10,284,612 | B2* | 5/2019 | Zhang | H04N 21/6373 |
| 10,595,052 | B1* | 3/2020 | Worley, III | H04N 21/4627 |
| 2002/0078220 | A1* | 6/2002 | Ryan | H04N 21/4307 709/231 |
| 2004/0164896 | A1* | 8/2004 | Evans | G01S 5/0027 342/357.31 |
| 2004/0229656 | A1* | 11/2004 | Takahashi | G09G 5/346 455/566 |
| 2005/0007351 | A1* | 1/2005 | Fabrick, II | G06F 3/038 345/181 |
| 2005/0102290 | A1* | 5/2005 | Enko | H04L 67/10 |
| 2005/0111831 | A1* | 5/2005 | Matsumi | G11B 27/034 386/241 |
| 2005/0144134 | A1* | 6/2005 | Hirano | H04H 60/19 705/51 |
| 2007/0053658 | A1* | 3/2007 | Murakami | G11B 27/105 386/248 |
| 2008/0077590 | A1* | 3/2008 | Pandit | G06F 16/1847 |
| 2008/0214142 | A1* | 9/2008 | Morin | G08B 25/016 455/404.2 |
| 2008/0298384 | A1* | 12/2008 | Beaucage | B61L 15/0036 370/445 |
| 2009/0322904 | A1* | 12/2009 | Takahashi | H04N 5/772 348/231.3 |
| 2010/0180044 | A1* | 7/2010 | Olsson | H04L 65/60 709/231 |
| 2010/0211636 | A1* | 8/2010 | Starkenburg | H04N 7/17318 709/203 |
| 2010/0245582 | A1* | 9/2010 | Harel | G08B 13/19695 348/159 |
| 2011/0085033 | A1* | 4/2011 | McDonald | H04N 7/18 348/143 |
| 2011/0093617 | A1* | 4/2011 | Igarashi | H04N 21/658 709/246 |
| 2011/0134329 | A1* | 6/2011 | Chen | G06T 5/50 348/699 |
| 2012/0001923 | A1* | 1/2012 | Weinzimmer | G06F 3/167 345/473 |
| 2012/0150826 | A1* | 6/2012 | Vijayan Retnamma | G06F 16/22 707/692 |
| 2012/0163255 | A1 | 6/2012 | Choi | |
| 2012/0221681 | A1* | 8/2012 | Yuan | H04N 21/47202 709/217 |
| 2012/0284765 | A1* | 11/2012 | Killick | H04N 21/274 725/111 |
| 2014/0025771 | A1* | 1/2014 | Tanaka | H04N 21/2326 709/213 |
| 2014/0095803 | A1* | 4/2014 | Kim | G06F 12/0804 711/143 |
| 2014/0101115 | A1* | 4/2014 | Ko | G06F 16/1727 707/692 |
| 2015/0095566 | A1* | 4/2015 | Itagaki | G06F 3/0682 711/111 |
| 2015/0215738 | A1* | 7/2015 | Frusina | H04W 4/023 455/426.1 |
| 2015/0356281 | A1* | 12/2015 | Van Deventer | G06F 21/16 713/176 |
| 2016/0191742 | A1* | 6/2016 | Chen | H04N 1/2112 348/231.2 |
| 2016/0234847 | A1* | 8/2016 | Zhang | H04W 60/02 |
| 2017/0013045 | A1* | 1/2017 | Predmore, II | H04L 67/06 |
| 2019/0012908 | A1* | 1/2019 | Chun | G08G 1/0125 |

FOREIGN PATENT DOCUMENTS

| | | | |
|---|---|---|---|
| JP | 2002237139 A | * | 8/2002 |
| JP | 2008176931 A | * | 7/2008 |
| JP | 2010238352 A | * | 10/2010 |
| JP | 5064531 B2 | * | 10/2012 |
| KR | 20080075289 A | * | 8/2008 |
| WO | WO-2012095658 A1 | | 7/2012 |

* cited by examiner

UPLOADING DATA FROM MOBILE DEVICES

CROSS-REFERENCE TO RELATED APPLICATION

This application is the national phase under 35 U.S.C. § 371 of PCT International Application No. PCT/US2015/011571, filed Jan. 15, 2015, claims the benefit of and priority to U.S. Provisional Patent Application No. 61/935,974, filed Feb. 5, 2014, the contents of which are incorporated herein by reference in their entirety.

BACKGROUND OF THE INVENTION

1. Field of the Invention

The present disclosure relates to data transfers, and more particularly to data uploads from mobile devices to network locations which may exist on separate logical computing networks, for example uploads of video files from mobile digital video recorders to fixed facility network locations.

2. Description of Related Art

A variety of protocols and techniques are used for uploading data files from mobile devices. When data files are relatively large, the upload process can be complicated by long upload times. As one example, if a public transportation vehicle, such a train or bus, has a digital video recorder that uploads video files to a server at a main transportation depot, the vehicle may be detained at the depot solely so that the upload can be completed before the vehicle departs. For a relatively large video file, the download time could be on the order of an hour or more. By way of a another example, a more common conventional implementation is to request data from the mobile device and for as long as the mobile device is located at the depot, the upload proceeds. However the vehicle may depart the depot at any point during the upload whereupon the upload terminates. Upon the return of the vehicle to the depot, the upload may resume where it left off once the mobile device has reestablished connection to both the same logical computing network and the previously uploaded data file. Moreover, if there is an error at any point during the upload, it may be necessary to restart the upload from the beginning.

Such conventional methods and systems have generally been considered satisfactory for their intended purpose. However, there is still a need in the art for improved systems and methods for uploading data files. The present disclosure provides a solution for this need.

SUMMARY OF THE INVENTION

A method of transferring data includes connecting a mobile device to each of a plurality of network devices at separate respective times and via a respective network connection for each network device, wherein each of the network devices is connected to a separate respective logical computing network. The method also includes transferring a different respective portion of a data file from the mobile device to each respective network device via the respective network connection and storing the respective portion of the data file on the respective logical computing network. The method further includes disconnecting the mobile device from each respective network connection before connecting to any other one of the network devices. As further described below, it is also contemplated that the method can account for instances where disconnection of the mobile device from a network device results in incomplete or corrupt transfer of data.

In one embodiment, a logical computing network is an arrangement of computing devices and resources into defined groups or segments by a hierarchical addressing scheme. Logical computing networks may operate independently, dependently, or both and may share data and other resources using a network device and/or any other suitable type of computing equipment. A network device is a device which provides network connectivity between the mobile device and a respective logical computing network. The connection may be intermittently available or have limited capability. It is also contemplated that in one embodiment, a mobile device is a device which contains both onboard data storage and a means of periodically connecting the device to a logical computing network. Network devices may be physically located at the same location (right next to one another) yet attached to separate logical computing networks. The mobile device may be programmed to connect to one network device in one scenario and the other network device in another scenario. Transfer of data to different network devices would result in data storage on separate logical computing networks.

In one aspect, any of the network connections can include a WAN connection, a LAN connection, a wired connection, a wireless connection, a mobile (e.g., cellular) connection, and/or any other suitable type of network connection. The method can include stitching the separate portions of the data file into a complete or partial copy of the original data file. Transferring the different respective portions of the data file can include transferring the respective portions out of order. The method can include reading respective portions of the data file out of order relative to other respective portions of the data file.

In another aspect, the method can include detection of an interrupted upload wherein the previous portion of the transferred data file exists. The method can further include resumption of the previous upload activity by appending new data into the existing data file.

In another aspect, the method can include detecting corruption in a received copy of one or more of the portions of the data file. The method can further include transferring a second copy of any portion of the data file having corruption to replace corrupt data, wherein transferring the second copy is performed without transferring second copies of corruption-free portions of the data file.

It is also contemplated that the method can include appending each separate portion of the data file with at least one of a respective job identification, a respective session identification, and a separate positional location address for data contained within the data file. The method can include treating each separate portion of the data file as an independent upload, and using each separate portion of the data file as an independent upload. It is also contemplated that the method can include treating each separate portion of the data file as a dependent upload. The method can include communicating a storage location of each separate portion of the data file received by a logical computing network to a central controller wherein the storage location contains information necessary to locate the separate portion of the data file on a logical computing network.

In one aspect, the mobile device can be a mobile digital video recorder, the data file can be a video recording, and transferring the respective portions of the data file can include transferring the video recording from the mobile digital video recorder, in whole, in part, or in multiple parts to one or more logical computing network locations. The method can include playing one or more portions of the video recording which have been stored as files in one or more logical computing network locations in or out of chronological order.

In certain embodiments, each separate respective logical computing network location is a geographically restricted to respective transportation depot. Transferring the respective portions of the data file from the mobile device can include transferring the respective portions of the data file at respective transportation depots.

A system for transferring data includes a plurality of network devices each at a separate logical computing network location. A central controller is operatively connected to the network devices. The network devices and central controller are configured for transferring a plurality of separate portions of a data file from a mobile device, wherein each of the separate portions of the data file is transferred from the mobile device to a separate respective one of the network devices.

Each of the network devices can include a data storage medium operatively connected thereto for storing a respective portion of the data file. Each of the network devices can be operatively connected to a respective wireless network hub for wirelessly receiving a respective portion of the data file. The central controller can be configured to access portions of the data file stored locally in respective ones of the network devices. It is also contemplated that the central controller can be configured to stitch together the separate portions of the data file to form a complete or partial copy of the original data file.

A mobile device can include a digital video recorder and a wireless communication component operatively connected to one another to upload separate portions of the data file at separate ones of the network devices, wherein the data file is a video recording. At least one of the central controller and the network devices can be configured to detect corruption in the separate portions of the data file and to upload a second copy of any portion of the data file having corruption without uploading second copies of corruption-free portions of the data file.

In another aspect of this disclosure, a method of transferring data can include connecting a mobile device to a network device at separate respective times and via a respective network connection, wherein the network device is connected to a logical computing network. The method includes transferring a respective portion of a data file from the mobile device to the network device via the respective network connection and storing the respective portion of the data file on the logical computing network. The method also includes disconnecting the mobile device from the respective network connection before connecting to the same or a different network device to transfer a different respective portion of the data file from the mobile device at a different respective time.

In accordance with another aspect of the disclosure, a method of data integration includes stitching together the separate portions of a data file to form a complete or partial copy of the original data file.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
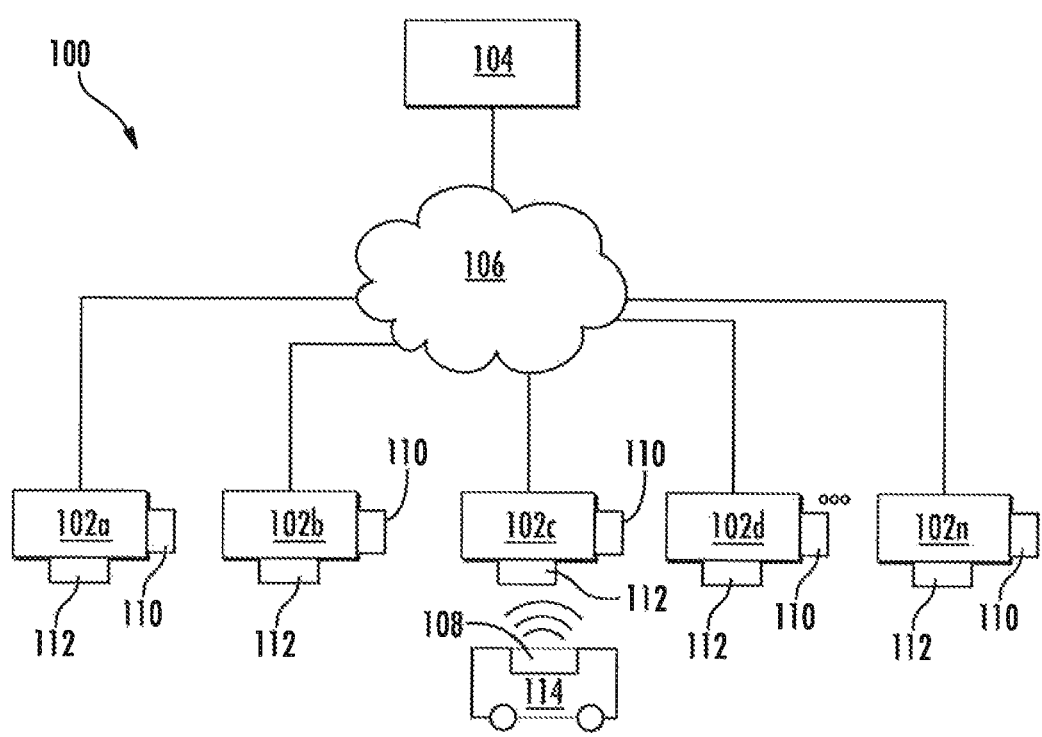
FIG. 1 is a schematic view of an exemplary embodiment of a system constructed in accordance with the present disclosure, showing a mobile device and a plurality of network devices at different logical computing network locations.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used for uploading data files from mobile devices, such as uploading video files from digital video recorders onboard vehicles.

System 100 is configured for transferring data and includes a plurality of network devices 102a-102n. It is also contemplated that each of the network devices 102a-102n can be located at a separate physical location from the others, e.g., at a separate transportation depot. It is to be understood that while five network devices 102a-102n are depicted in FIG. 1, any suitable number of network devices can be used. A central controller 104 is operatively connected to the network devices 102a-102n, for example by connecting through the Internet 106 or any other suitable type of network such as an internetwork. The network devices 102a-102n and central controller 104 are configured for transferring a plurality of separate portions of a data file from a mobile device 108, wherein each of the separate portions of the data file is transferred from the mobile device 108 to a separate respective one of the network devices 102a-102n. It should be noted that where possible, an entire data file can be uploaded to a single network device in portions or as a single upload, but for this example a plurality of network devices 102a-102n are described as in situations where it is not possible or not practical to upload an entire data file to a single network device.

In one embodiment, a logical computing network is an arrangement of computing devices and resources into defined groups or segments by a hierarchical addressing scheme. Logical computing networks may operate independently, dependently, or both and may share data and other resources using a network device and/or any other suitable type of computing equipment. A network device is a device which provides network connectivity between the mobile device and a respective logical computing network. The connection may be intermittently available or have limited capability. It is also contemplated that in one embodiment, a mobile device is a device which contains both onboard data storage and a means of periodically connecting the device to a logical computing network. Network devices may be physically located at the same location (right next to one another) yet attached to separate logical computing networks. The mobile device may be programmed to connect to one network device in one scenario and the other network device in another scenario. Transfer of data to different network devices would result in data storage on separate logical computing networks.

Each of the network devices 102a-102n can include a data storage medium 110 operatively connected thereto for storing a respective portion of the data file. Each of the network devices can be operatively connected to a respective wireless network hub 112 for wirelessly receiving a respective portion of the data file. The central controller 104 can be configured to access portions of the data file stored locally in respective ones of the network devices 102a-102n. It is also contemplated that the central controller 104 can be configured to stitch together the separate portions of the data file to form a complete or partial copy of the original data file. The uploaded portions of the data file can be read or accessed independently, as in a partial upload of the whole data file, or dependently, e.g., after stitching together a complete uploaded copy of the original data file. It should be noted that original data file refers to content selected for upload, which can be a portion or entirety of one or more files constituting a potentially vast amount of original content.

Central controller 104 can provide mobile device 108 a list of network devices 102a-102n which can receive uploads from mobile device 108 and/or mobile device 108 stores this list in an onboard device memory, whereupon mobile device 108 may independently initiate data upload to available network devices 102a-102n. In one example, upon establishing an operational connection between the mobile device 108 and the central controller 104, the mobile device 108 provides the central controller 104 the transaction log of upload activity by the mobile device 108 on the network devices 102a-102n wherein the transaction log includes storage locations for uploaded data files. In another example, without establishing an operational connection between the mobile device 108 and the central controller 104, the central controller 104 checks the established list of network devices 102a-102n for the existence of data files uploaded from the mobile device 108. One potential benefit of this arrangement is that the central controller 104 and mobile device 108 can work independently once the list of network devices 102a-102n has been established.

By way of non-limiting example, mobile device 108 can include a digital video recorder and a wireless communication component operatively connected to one another to upload separate portions of the data file at separate ones of the network devices 102a-102n, wherein the data file is a video recording. For example, digital video recorder and wireless communication component can be onboard a vehicle 114 such as a bus, train, or the like. It is contemplated that the network connections between the mobile device 108 and the network devices 102a-102n can include a WAN connection, a LAN connection, a wired connection, a wireless connection, a mobile (e.g., cellular) connection, or any other suitable type of network connection. At least one of the central controller 104 and the network devices 102a-102n can be configured to detect corruption in the separate portions of the data file and to upload a second copy of any portion of the data file having corruption without uploading second copies of corruption-free portions of the data file.

Figure 2:
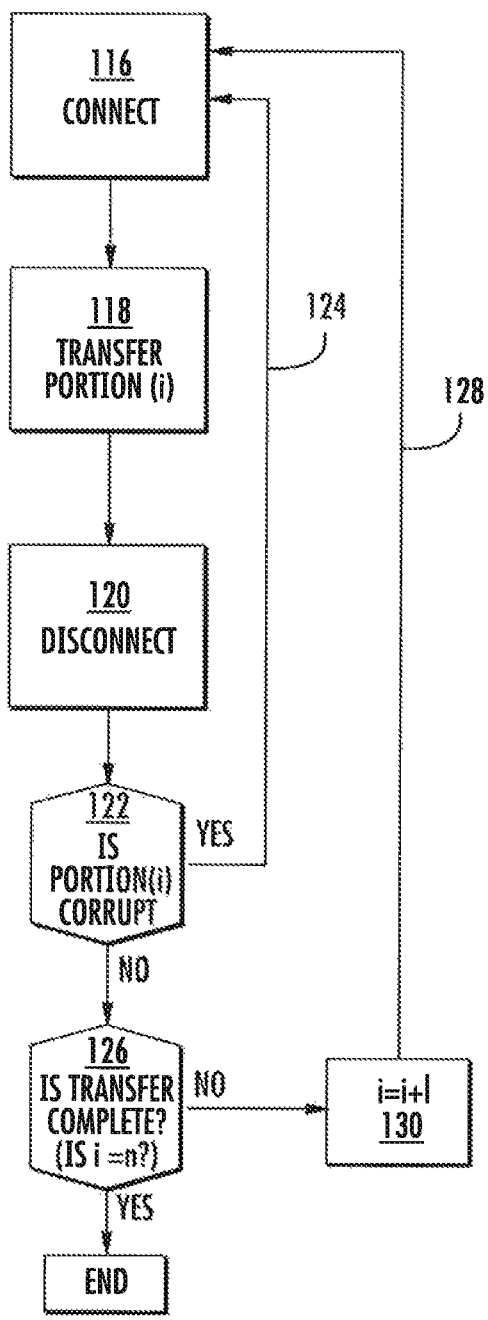
FIG. 2 is a flow chart of an exemplary embodiment of a method in accordance with the present disclosure, showing steps for uploading a plurality of separate portions of a data file at respective ones of the logical computing network locations of FIG. 1.

With reference now to FIG. 2, a method of transferring data is described. The method includes a step 116 for connecting a mobile device, e.g., mobile device 108, to a network device, e.g. one of network devices 102a-102n, via a respective network connection. This connection can be, for example, a wireless connection to a local network physically located at the location of the respective network device.

The method also includes a step 118 for transferring a respective portion (i) of a data file from the mobile device to the respective network device via the respective network connection. The method further includes a step 120 for disconnecting the mobile device from each respective network connection before connecting to any other one of the network devices, if any. The steps of connecting, transferring, and disconnecting 116, 118, and 120 are repeated for each of a plurality of network devices, each at a different logical computing network location, and a different portion of the data file is transferred to each of the respective network devices until the entire data file has been uploaded from the mobile device. In this way, the entire file can be transferred without the mobile device having to remain connected to any one particular network device for the duration of the entire upload. So, for example, the mobile device can be a digital video recorder on board a bus, and the data file can be a video recording on the digital video recorder. The upload requirements can be defined by a requestor, e.g., an agency requesting uploading of a portion of the video file from the digital video recorder corresponding to a particular event. Once the requestor has requested the upload, the bus can go through its route stopping at various depots throughout the day, and at each depot a portion of the data file can be uploaded, and the process can continue depot by depot until the entire file has been uploaded.

The method can include stitching the separate portions of the data file into a complete or partial copy of the data file. The method can use a previously embedded positional location address for data contained within the data file along with standard or proprietary methods as applicable to the type of data to copy information from within each uploaded portion of the data file to a temporary location where the data file is stitched or integrated into a complete or partial copy of the data file. It is contemplated that stitching a partial copy of the data file may include stitching available data portions into a single file where each data portion is positioned within the stitched data file relative to other respective portions of the data file based on the previously embedded positional location address. The stitching can occur upon completion of all the uploads, or dynamically as each portion of the data file becomes available, or upon specific command by the requestor. The complete or partial copy of the data file uploaded and stitched as described above can be moved from the temporary location to a designated location or folder, for example, and the temporary copy and copies of any portions of the data file on the network devices can be deleted. This provides a data integration solution that takes random data sets which were once part of a larger whole and reintegrates them into that larger whole.

To continue with the example of a mobile device on a bus described above, once the entire data file has been uploaded by portions to the various network devices at the different depots, a central controller, e.g., controller 104 described above, can stitch a copy of the entire file together using the separate portions at the respective depots. The method can include communicating to the central controller a storage location on a logical computing network of each separate uploaded portion of the data file. For example, when an operational connection exists between the mobile device 108 and the central controller 104, the mobile device 108 may provide a transaction log of upload activity which includes storage locations for uploaded data files. In another example, the central controller 104 checks the established list of network devices 102a-102n for the existence of uploaded data files. The central controller 104 could coordinate consolidation of the separate data file portions onto one of the network devices 102a-102n or even to a separate location. The consolidated file can be stitched together for reading, e.g., if the data file is a video, the video can be played and viewed.

In one aspect, access to logical computing network locations is managed by the central controller 104 by loading authorization keys to the mobile device 108. Methods of controlling access to logical computing networks are not limited to this example. It is contemplated that upon mobile device 108 connecting to a logical computer network through a network device, e.g., network device 102a, the mobile device 108 can operationally connect to the central controller 104 and provide a transaction log of upload activity by the mobile device 108.

In another example, the central controller 104 will have been the originator of the upload request to the mobile device 108. The central controller 104 also maintains the list of logical computing network locations where uploads are permitted. In such a scenario, the central controller 104 may periodically check the storage medium 110 at each logical computing network location for the presence of an uploaded file. Upon knowing an upload file exists, whether it is by notification from the mobile device 108 to the central controller 104 or by a query from central controller 104 to storage media 110, the central controller 104 may assess the resulting information to schedule a stitching activity.

It is also contemplated that in an exemplary embodiment, the method can include appending each separate portion of the data file with at least one of a respective job identification, a respective session identification, and a separate positional location address for data contained within the data file. The separate positional location address is the logical address of the data contained within the subject data file with respect to where it was located within the original data file. This information along with the other parts mentioned can be used to reconstruct, e.g., stitch together, the original data file from the disparate parts. The available portions of the original data file can be stitched into a stitched data file wherein each portion of the data file is positioned within the stitched data file at the same respective positional location address of the respective portion as in the data file. This file appending can take place, for example, between step 120 and step 126 in FIG. 2. Each separate portion of the data file can be treated as an independent upload, and it is possible for each separate portion of the data file to be used as an independent upload. One potential benefit of breaking the data file into separate portions for uploading is that transferring the different respective portions of the data file can include transferring the respective portions out of order. The method can include reading one of the respective portions of the data file out of order relative to other respective portions of the data file, e.g., during the looping of steps 116, 118, and 120 in FIG. 2. To continue the example from above, if the digital video recorder of the bus is able to make the uploads of a few of the portions of the data file, but has not yet completed the full data file upload, it is possible for a user to view the video content in the portions that have already uploaded without having to wait for the entire data file to upload. Moreover, it is not necessary for the data file to be uploaded in chronological order—the portions of the data file can be uploaded, played, and viewed in any suitable order.

Additionally, if one of the portions uploaded goes missing, only the missing portion needs to be re-uploaded.

The exemplary concept described above can be summarized as including (1) establishing a set of preauthorized network locations to which the mobile device can upload data, (2) allowing the mobile device to autonomously determine whether to upload the data based on programmed criteria, (3) allowing the mobile device to autonomously track progress of the programmed upload, and (4) allowing the central controller to autonomously check for the presence of uploaded data files at the predefined locations, all without (5) requiring either the mobile device or central controller to share upload progress which is a key aspect of this exemplary method.

A step 122 can be included for detecting corruption in a received copy of one or more of the portions of the data file. For example, after each portion of the data file is uploaded, it can be scanned for corruption. If the scanned portion of the data includes corruption, it can be re-uploaded, for example by having the mobile device re-upload the portion that was corrupt upon connection at the next network device, as indicated by loop 124 in FIG. 2. In this way, a second copy of any portion of the data file having corruption can be uploaded to replace corrupt data, without having to upload second copies of corruption-free portions of the data file. In summary, the corruption replacement process may dynamically scan a predefined list of authorized storage locations for new portions of the data file, or use transaction updates provided by the mobile device, or both, for example, to update the status of the original upload request to the requestor. Given the out-of-sequence accessibility to the data described above, re-upload of corrupt data segments only and file stitching are advantageous aspects of the methods describe herein.

Each time a corruption-free portion of the data file is uploaded, the process can be repeated starting with step 116 at the next network device, until the process of uploading the data file is complete. Step 126 is the decision point for whether the upload is complete, loop 128 is the loop for when there are remaining portions to download, and step 130 is a step for incrementing the count of portions of data file, where i is incremented starting from 1 and going to n, the total number of portions of the data file. It will be understood that other methods of incrementing can be used as well. For example, if it is not known beforehand how many portions the data file will be divided into, then the process of steps 116 through 120 can simply be repeated until the full data file has been uploaded. For example, if video is being uploaded from a bus, each time the bus pulls up to a depot the mobile device can upload as much of the data file as possible while the bus is at the depot. This process can be repeated at each subsequent depot having a network device until the full data file has been uploaded. In one implementation, a transaction log can be uploaded to the central controller each time a portion of the data file is uploaded at a depot and/or upon final completion of the full upload of the data file. This log can include a list of the locations of all the uploaded portions of the data file, and a log of any interruptions that occur during uploads of the various portions. In another implementation the session identification information appended to each file includes the current progress of the respective upload activity. When the central controller 104 performs a scan of authorized storage locations for new portions of the data file, current progress for a particular upload activity can be determined.

Any time an upload is interrupted, e.g., when a bus needs to leave a given depot, the upload can be continued from where it left off by uploading the next portion of the data file at the next depot. It is not necessary to have access to the interrupted (partial) upload file in order to resume the upload. If the previous interrupted (partial) upload file is available, the upload may optionally resume by appending to the previous upload file or initiating creation of a new upload file. Since the conventional operation of appending data to the end of an incomplete upload file in order to resume an incomplete upload can be eliminated, the opportunity that exists at each appending operation for corruption of the uploaded file can be reduced using the techniques described herein. Upon completion or interruption of an upload operation, the mobile device 108 updates transaction information which is made available to the control application, e.g., an application executed by the central controller 104.

However, it is not required that the mobile device share the transaction information with the control application. If the control application knows, e.g., has access to a stored list of, all the storage locations which the mobile device is authorized to use, the control application may periodically query these locations for the presence of an upload file. If any exist, the control application may take actions related to those files, e.g., detect corruption, request upload of corrupt or missing data files, detect upload progress, coordinate file consolidation, initiate file stitching, or any other action.

It is contemplated that there may be instances where the mobile device 108 has uploaded all portions of the data file but certain portions may be at logical computing network locations that are temporarily or permanently unavailable to the control application. In one implementation the session identification information appended to each file includes the current progress of the respective upload activity. When the central controller 104 performs a scan of authorized storage locations for new portions of the data file, current progress for a particular upload activity can be determined. If the session identification information indicates an upload progress as complete and all portions of the upload file are not present, the control application can require the mobile device 108 to re-upload the missing or inaccessible upload file. In another implementation, when the mobile device 108 provides the transaction update, the control application can check whether available upload files match the mobile device transaction update. If they are dissimilar, the control application can require the mobile device 108 to re-upload the missing or inaccessible upload file. These implementations are similar to the corrupt data file recovery routine described above, but apply to missing data. Those skilled in the art will readily appreciate that this functionality can be considered to be part of loop 128.

It will be understood by those skilled in the art that while described above in the exemplary context of having a central controller, a control application can be used as a central controller run on a central controller system to execute the central controller functions described herein. It is also contemplated that the control application may reside in whole or part at a single location, multiple locations, or on the mobile device itself. The control application may transmit one or more sets of upload requirements to the mobile device. The external control application may be software, firmware, purpose build hardware, a combination thereof, or any similar implementation which manages data transmission from the mobile device and/or information uploaded by the mobile device, e.g., data files.

While shown and described in the exemplary context of video files, public transportation, and transportation depots, those skilled in the art will readily appreciate that the systems and methods described herein can readily be applied to other types of data files, and any suitable application. Moreover, while the exemplary context of digital video recorders has been provided herein, those skilled in the art will readily appreciate that the systems and methods of the disclosure can readily be applied to any other suitable mobile device, such as lap tops, smart phones, vehicle based surveillance recorders, portable data collection or storage modules, and other similar devices that can store digital data. It is also contemplated that the requesting agency or requestor may be another application, part of the control application itself, a user interface to either, or a similar apparatus or method.

Potential benefits that may accompany some or all of the embodiments described herein include lack of requirement for contiguous start to end upload, use of multiple upload locations to increase the upload opportunities and reduce the time a requestor must wait, each upload file may be treated as both a dependent file and an independent file, lack of requirement to access previous partial upload to resume upload, lack of requirement to restart entire upload on corrupt partial upload, able to request re-upload of only the missing or inaccessible portion of the data file, elimination of append operation reduces opportunities for corruption of data, data stitching and integrity check can integrate partial uploads, and the ability to provide information on demand.

While described in the exemplary context of a mobile device connecting with different network devices one at a time, e.g., when a mobile device on a bus uploads portions of a data file at different transportation depots, those skilled in the art will readily appreciate that the methods described herein can retain the benefits described herein when connected to one logical network location, e.g., when a mobile device on a bus uploads portions of a data file one after another at the same transportation depot. This is because the systems and methods described herein can accommodate situations where a mobile device is typically expected to disconnect from the upload point at some time during the upload activity. As a practical consideration, one benefit that may not realized when connecting repeatedly to the same logical network location is that the number of opportunities to complete an upload are not necessarily increased, since there is only one logical network location. However it is contemplated that the other benefits described herein can still be realized.

In another example, it is contemplated that mobile device 108 can connect to multiple ones of the network devices 102a-102n at a time to transfer more than one portion of the data file at a time. For example, a mobile device 108 can connect to one network device that using a wireless connection, while also being connected to another network device using a cellular connection, wherein a different respective portion of the data file is transferred to each of the two network devices, and wherein during at least some of this transfer, both files are transferring at the same time, e.g., simultaneously.

Those skilled in the art will also readily appreciate that the central controller does not necessarily need to have control of network devices. The central controller can sit on a network just like any other network device, and can simply have a list of network keys (e.g., authorizations) for the network devices and it can provide a list of those keys to the mobile device so the mobile device may autonomously upload data to the network device and do so without needing to contact the central controller. The central controller can check or query those network locations for new data deposits.

The systems and methods described above can have a primary component that requires the mobile device to upload data to a known set of storage locations. These storage locations are accessed through a known set of network access points. The central controller 104 maintains the list of storage locations, the list of network access points, and the authorization keys. These are provided to the mobile device 108 by the central controller 104. Once the mobile device 108 has been loaded with the list of storage locations and network access points, the mobile device 108 may autonomously upload data without needed to contact the central controller 104. Each time the mobile device 108 uploads information, it can retain a transaction log of the uploaded session and information. When an operational connection between the mobile device 108 and central controller 104 is available, the mobile device 108 can provide the updated transaction log of upload session and information data to the central controller 104. Absent a recent transaction log of upload session and information data from a mobile device 108, the central controller 104 may query storage locations accessible by the mobile device 108 for uploaded data sets. These queries may happen manually or at programmed intervals as directed by a user.

When an uploaded data set is accessible by the central controller 104, it may be checked for data file corruption. The description above explains how corruption can be corrected. When an uploaded data file is accessible by the central controller 104, it may be checked for overall upload file completeness. Overall upload file completeness confirms that all upload files which are part of the original whole file have been uploaded. This may be done using appended information attached to the uploaded data file or files, e.g., session identification information, or by checking the upload session and information data provided by the mobile device. If an expected uploaded data set is missing, the central controller 104 may direct the mobile device 108 to re-upload the missing data set.

Network devices 102a-102n provide the mobile device 108 access to the computing network. As such network devices 102a-102n are physical devices and have a physical location. Network devices 102a-102n may be located next to one another or may be separated by short or great distances. Networks to which network devices 102a-102n provide access are not limited to a physical or real world location. As such two of the network devices 102a-102n may be physically mounted next to one another and yet provide access to totally different networks. Further, the mobile device 108 may be programmed to connect to one of the network device 102a-102n in one set of circumstances and to another one of the network devices 102a-102n in another set of circumstances. Those skilled in the art will readily appreciate that this disclosure is not limited to exclude such implementations.

Network data storage locations on a network as described herein are not limited to a physical or real world location. Those skilled in the art will readily appreciate that the examples provided herein having different network data storage locations as corresponding to different physical locations are provided as non-limiting examples.

Information appended to upload files, e.g., job identification, session identification, positional location address, or the like, can enable the stitching (data reintegration) function described herein. Information appended to upload files can also enable the central controller 104 to check for missing upload files when a list of upload session and information data has not been provided by the mobile device 108.

Those skilled in the art will readily appreciate that the systems and methods described herein can be used in lieu of or in conjunction with conventional methods of resuming downloads by appending new data to the previous upload file, treating individual upload files as part of an upload file set, and treating individual upload files as individual upload files. The methods described herein do not necessarily have to supplant conventional data transfer methods.

The methods and systems of the present disclosure, as described above and shown in the drawings, provide for data transfer with superior properties including improved uploading from mobile devices. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. In a system comprising a central controller configured for connectivity with a plurality of network devices via a network connection, a method of transferring mobile-based surveillance data comprising:
   connecting a mobile device to each of a plurality of network devices at separate respective times and via a respective mobile device network connection for each network device, wherein the connecting occurs only when the mobile device is capable of making an upload of mobile-based surveillance data from the mobile device to a network device, and wherein each of the network devices is connected to a separate respective logical computing network;
   embedding each different respective portion of a surveillance data file with at least one positional location address;
   transferring each different respective portion of the surveillance data file from the mobile device to each respective network device via the respective mobile device network connection and storing the respective portion of the surveillance data file on the respective logical computing network associated with each network device;
   operating the mobile device independently of connectivity with and management by the central controller when transferring each different respective portion of the surveillance data file from the mobile device to each respective network device via the respective mobile device network connection; and
   disconnecting the mobile device from each respective mobile device network connection before connecting to any other one of the network devices.

2. A method as recited in claim 1, wherein any one of the network connections includes a WAN connection, a LAN connection, a wired connection, a wireless connection, or a mobile connection.

3. A method as recited in claim 1, further comprising stitching the separate portions of the surveillance data file into a complete or partial copy of the surveillance data file.

4. A method as recited in claim 1, further comprising stitching available portions of the surveillance data file into a single stitched surveillance data file wherein each portion of the surveillance data file is positioned within the stitched surveillance data file relative to other respective portions of the surveillance data file based on positional location addresses of the portions of the surveillance data file.

5. A method as recited in claim 1, wherein transferring the different respective portions of the surveillance data file includes transferring the respective portions out of order.

6. A method as recited in claim 1, further comprising reading one of the respective portions of the surveillance data file out of order relative to other respective portions of the surveillance data file.

7. A method as recited in claim 1, further comprising:
detecting corruption in a received copy of one or more of the portions of the surveillance data file; and
transferring a second copy of any portion of the surveillance data file having corruption to eplace corrupt data, wherein transferring the second copy is performed without transferring second copies of corruption-free portions of the surveillance data file.

8. A method as recited in claim 1, further comprising:
detecting whether all respective portions of the surveillance data file have been uploaded or whether an uploaded portion of the surveillance data file is missing or inaccessible, and
transferring a second copy of any respective portion of the surveillance data file as needed to replace missing data, wherein transferring the second copy is performed without transferring second copies of available portions of the surveillance data file.

9. A method as recited in claim 1, further comprising treating each separate portion of the surveillance data file as an independent or dependent upload.

10. A method as recited in claim 1, further comprising using each separate portion of the surveillance data file as an independent upload or as a dependent upload.

11. A method as recited in claim 1, further comprising accessing one or more portions of the surveillance data file independently or dependently.

12. A method as recited in claim 1, further comprising appending each separate portion of the surveillance data file with at least one of a respective job identification or a respective session identification.

13. A method as recited in claim 1, further comprising communicating a storage location of each separate portion of the surveillance data file received to a central controller.

14. A method as recited in claim 1, wherein the mobile device is a mobile digital video recorder, wherein the surveillance data file is a video recording, and wherein transferring the respective portions of the surveillance data file includes transferring the video recording from the mobile digital video recorder.

15. A method as recited in claim 14, further comprising playing one or more portions of the video recording out of chronological order.

16. A method as recited in claim 1, wherein each separate respective logical computing network is at a respective transportation depot, and wherein transferring the respective portions of the surveillance data file from the mobile device includes transferring the respective portions of the surveillance data file at respective transportation depots.

17. A system for transferring mobile-based surveillance data comprising:
a plurality of network devices each at a separate logical computing network location, wherein each of the network devices includes a data storage medium operatively connected thereto for storing a respective portion of a mobile-based surveillance data file;
a central controller operatively connected to the network devices for embedding each different respective portion of the surveillance data file with at least one positional location address; and
a mobile device configured for:
operating independently of connectivity with and management by the central controller, and
transferring a plurality of the separate portions of the data file from the mobile device, wherein each of the separate portions of the surveillance data file is transferred from the mobile device to a separate respective one of the network devices, and
connecting the mobile device to each network device only when the mobile device is capable of making an upload of surveillance data from the mobile device to the network device.

18. A system as recited in claim 17, wherein at least one of the central controller and the network device is configured to:
detect whether all respective portions of the surveillance data file have been uploaded or whether an uploaded portion of the surveillance data file is missing or inaccessible, and
transfer a second copy of any respective portion of the surveillance data file as needed to replace missing or inaccessible data, wherein transferring the second copy is performed without transferring second copies of available portions of the surveillance data file.

19. A system as recited in claim 17, wherein each of the network devices is operatively connected to a respective wireless network hub for wirelessly receiving a respective portion of the surveillance data file.

20. A system as recited in claim 17, wherein the central controller is configured to access portions of the surveillance data file stored locally in respective ones of the network devices.

21. A system as recited in claim 20, wherein the central controller is configured to stitch together the separate portions of the surveillance data file to form a complete or partial copy of the surveillance data file.

22. A system as recited in claim 17, wherein the central controller is configured to stitch available portions of the surveillance data file into a single stitched surveillance data file wherein each portion of the surveillance data file is positioned within the stitched surveillance data file at the same respective positional location address of the respective portion as in the surveillance data file.

23. A system as recited in claim 17, further comprising a mobile device including a digital video recorder and a wireless communication component operatively connected to one another to upload separate portions of the surveillance data file at separate ones of the network devices, wherein the surveillance data file is a video recording.

24. A system as recited in claim 17, wherein at least one of the central controller and the network devices is configured to detect corruption in the separate portions of the surveillance data file and to upload a second copy of any portion of the surveillance data file having corruption without uploading second copies of corruption-free portions of the surveillance data file.

25. In a system comprising a central controller configured for connectivity with a plurality of network devices via a network connection, a method of transferring surveillance data comprising:
providing a mobile device with a list of network authorization keys;
connecting the mobile device to a network device at separate respective times and via a respective mobile device network connection, and connecting only when the mobile device is capable of making an upload of surveillance data from the mobile device to the network device, wherein the network device is connected to a logical computing network;

embedding each different respective portion of a mobile-based surveillance data file with at least one positional location address;

transferring each respective portion of the surveillance data file from the mobile device to the network device via the respective mobile device network connection and storing the respective portion of the surveillance data file on the logical computing network;

operating the mobile device independently of connectivity with and management by the central controller when transferring each different respective portion of the surveillance data file from the mobile device to each respective network device via the respective mobile device network connection;

disconnecting the mobile device from the respective network connection before connecting to the network device to transfer a. different respective portion of the surveillance data file from the mobile device at a different respective time; and wherein the steps of connecting, transferring, and disconnecting are performed without requiring the mobile device to connect to the central controller.

\* \* \* \* \*